UNITED STATES PATENT OFFICE.

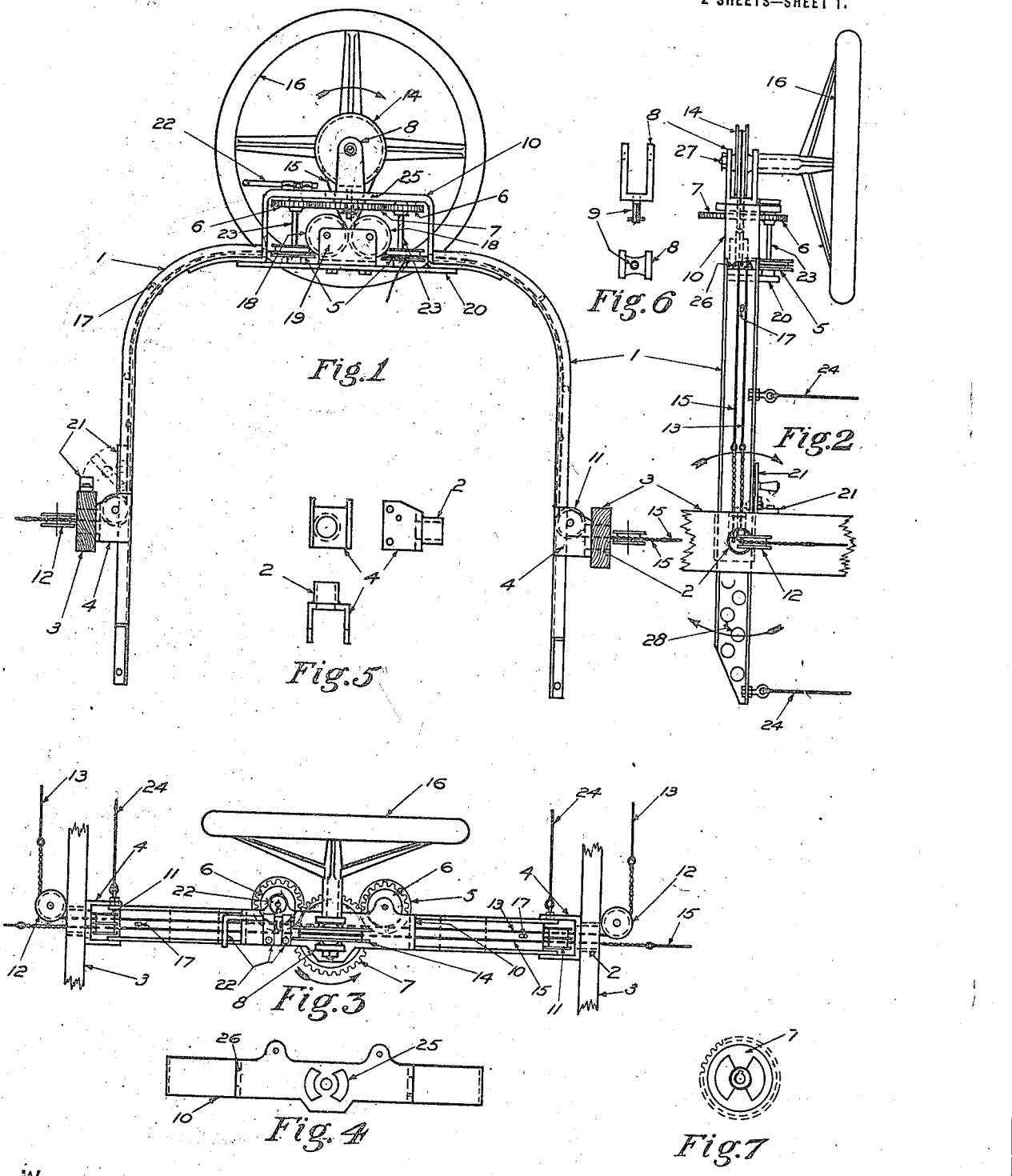

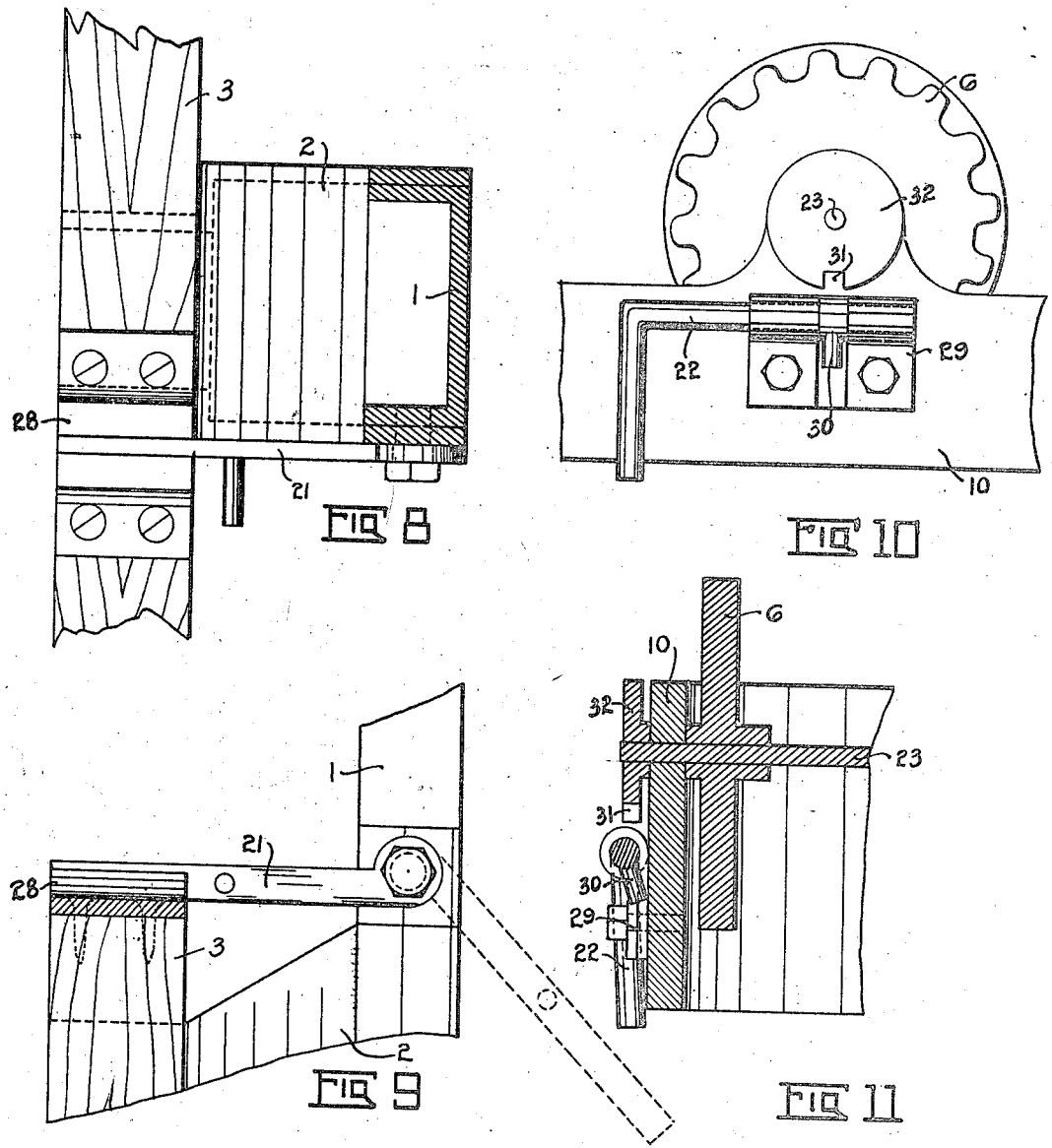

WALTER ST. JOHN MILLER, OF CALGARY, ALBERTA, CANADA.

CONTROLLING DEVICE.

1,293,160.   Specification of Letters Patent.   Patented Feb. 4, 1919.

Application filed October 10, 1917. Serial No. 195,829.

*To all whom it may concern:*

Be it known that I, WALTER ST. JOHN MILLER, a subject of King George of Britain, residing at Calgary, in the Province of Alberta, in the Dominion of Canada, have invented certain new and useful Improvements in Controlling Devices, of which the following is a specification.

My invention relates to improvements in flying or air-machine controls, and the object is to eliminate the use of the feet for the operations of ascending, descending, steering, or lateral balancing about the longitudinal axis of an air-machine.

I achieve this by the device shown in the accompanying drawings, in which—Figure 1 is a front view showing the hand-wheel for controlling the ailerons or wing-tips for warping, the forked standard through which the stem of the hand-wheel passes, and the grooved yoke frame pivotally mounted in the seat frame or other suitable members of an air-machine. Fig. 2 is a side view of the device showing the grooved yoke frame with the elevator lines connected thereto, and the rudder cables passing around the guide wheel. Fig. 3 is a top view of the device showing the hand-wheel to control the ailerons, the gear wheels of the rudder control operated by the stem of the hand-wheel, the grooved yoke frame and elevator lines, and the necessary control cables. Fig. 4 is a top view of the upper bearing plate with slots through which the cables to the ailerons pass. Fig. 5 details of the hollow trunnions through which pass the cables to the rudder and ailerons, said trunnions forming the pivot joints between the yoke frame and the seat rails. Fig. 6 details of the forked standard in which the flanged wheel or drum of the ailerons control is mounted. Fig. 7 is a detail of the main gear wheel of the rudder control with slots for the same purpose as those in the upper plate shown in Fig. 4. Fig. 8 is an enlarged detail of the stop to lock the yoke frame in its relation to the seat rail, looking down from above. Fig. 9 is a front view of the same stop. Fig. 10 is an enlarged detail of the stop mounted on the bearing plates to lock the rudder control. Fig. 11 is a section through the stop of the rudder control showing the relation to the pinions and bearing plate.

Similar numbers refer to similar parts throughout the several views.

Control of the ailerons is effected by the hand-wheel 16 which has a motion similar to that of the steering wheel of an automobile. The stem 27, on which the hub of the hand-wheel is rigidly mounted, passes through a forked standard 8, and has rigidly mounted thereon, between the forks of the standard, a flanged wheel or drum 14, to take the aileron cable 15. The cable 15 after passing around the flanged wheel or drum 14, and through the slots 25 in the top of the upper bearing plate 10, and through similar slots in the gear wheel 7, travels around the smaller flanged wheels 18, through slots 26 in the vertical sides of the bearing plate 10, along the longitudinal groove in the yoke frame 1, through the hollow trunnions 2, mounted in the seat rails, to the ailerons. The smaller guide wheels 18 are pivotally mounted in the brackets 19 which brackets are rigidly mounted on the lower bearing plate 20.

Control of the rudder is effected by the movement of the stem of the hand-wheel in a horizontal circle similar to the motion of a tiller in a boat. The stem 27 of the hand wheel 16, passes through the standard 8, which said standard has a spindle 9, rigidly attached to its lower extremity. This spindle after passing through the bearing plate 10, on which plate it is pivotally mounted, has rigidly keyed thereon a gear wheel 7, the teeth of which gear wheel engage in the teeth of the two smaller gear wheels or pinions 6, one on either side. These gear wheels or pinions 6, are rigidly mounted on two shafts 23, directly beneath the upper bearing plate 10, the two shafts 23, being perpendicular to and having bearings in the upper bearing plate 10, and the lower bearing plate 20. Rigidly mounted at the lower end of the shafts 23, and immediately above the lower plate 20, are flanged pulleys 5, around which pulleys the rudder cables pass. After leaving the flanged pulleys 5, the rudder cables 13 pass along a longitudinal groove in the yoke frame 1, underneath the flanged guide wheels 11, through the axis of the trunnions 2, and around the guide wheels 12, to the rudder.

The elevator lines 24 are operated by the grooved yoke frame 1. The yoke frame 1 is of U section and has a motion in a vertical plane in a line passing approximately through the center of gravity of the machine, turning on the hollow trunnions 2, mounted in the seat rail 3, so that to raise or lower the elevator planes all that is necessary is to pull or push the hand wheel 16.

A stop is provided to enable the pilot to lock the grooved yoke frame 1 to the seat rail 3 or other suitable member of the air-machine at will and consists of an arm or lever 21 pivotally mounted on the yoke frame 1 the free end engaging in a forked plate 28 rigidly mounted on the seat rail 3. A stop is also provided to enable the locking of the rudder control and consists of a lever 22 mounted in a bearing 29 the said bearing being rigidly mounted on the upper bearing plate 10, the lever having a semi-circular motion, a tongue 30 on the said lever engaging in the slot 31 in a wheel or flange 32, the said flange or wheel 32 being rigidly mounted on the shaft 23 which said shaft also carries the pinion 6 of the rudder control.

From the foregoing description it will be apparent that by turning the hand-wheel on its horizontal axis, motion is given to the ailerons, by pushing the hand wheel to either side on an axis perpendicular to the axis of the stem of the hand-wheel motion is given to the rudder, and by moving the grooved yoke frame in a vertical plane in a fore and aft direction motion is given to the elevator planes. By this arrangement it is possible to operate any one unit of control independently of any other unit, also to operate any desired combination of such units at one and the same time.

I am aware that prior to my invention controls have been used in which a yoke frame and hand wheel were employed to control the elevator planes and ailerons. I do not, therefore, claim such an invention broadly but what I do claim and what I desire to secure by Letters Patent is:—

1. In a controlling device, the combination with a hand wheel having a stem revolubly mounted, of a forked standard in which the said stem has bearing, of a flanged wheel or drum rigidly mounted on the stem of the hand wheel between the forks of the standard, a yoke frame for supporting said forked standard, having shoulders joined by a bearing plate, brackets secured to the bearing plate, flanged drums revolubly mounted on said brackets, cables passing around the drums to control the ailerons or wing tips for warping, all substantially as set forth.

2. In a controlling device, the combination with a pivotally mounted grooved shoulder yoke frame, a bearing plate connecting the frame shoulders, and a forked standard having a spindle pivotally mounted in the said plate, of a hand wheel having a stem revolubly mounted in the standard, a gear wheel rigidly mounted on said fork spindle, smaller gears engaged therewith, pulleys secured to the shafts of said smaller gears, guides mounted on said yoke, and rudder cables leading from the said guides, and a locking device rigidly holding the hand wheel in respect to the bearing plate, all substantially as set forth.

3. The combination in a controlling device of a grooved shoulder yoke frame pivotally mounted by means of hollow trunnions to the seat rail or other suitable member of an air-machine, the said hollow trunnions allowing the passage of control cables to the rudder and ailerons, of bearing plates joining the shoulders of the yoke frame and having revolubly mounted therein gear-wheels on the spindles of which gear wheels are rigidly mounted flanged pulleys around which the cables to the rudder pass; of a forked standard pivotally mounted on the upper bearing plate and having a large gear wheel rigidly mounted on the end of the pivot beneath the bearing plate said gear wheel engaging with the before mentioned gear wheels of the rudder control; of a flanged drum revolubly mounted between the forks of the standard around which the cables to the ailerons pass, of a hand wheel rigidly mounted on the stem which passes through the forked standard and carries the drum aforesaid, all substantially as set forth.

WALTER ST. JOHN MILLER.

Witnesses:
C. M. ARNOLD,
WILFRID J. GRAY.